(12) United States Patent
Yang

(10) Patent No.: US 7,527,067 B2
(45) Date of Patent: May 5, 2009

(54) HANDLE CONTROL VALVE ASSEMBLY OF FAUCET

(76) Inventor: Tsai-Chen Yang, 235 Chung-Ho Box 8-24, Taipei (TW)

( * ) Notice: Subject to any disclaimer, the term of this patent is extended or adjusted under 35 U.S.C. 154(b) by 49 days.

(21) Appl. No.: 11/543,765

(22) Filed: Oct. 6, 2006

(65) Prior Publication Data

US 2008/0083460 A1   Apr. 10, 2008

(51) Int. Cl.
*F16K 31/60* (2006.01)
(52) U.S. Cl. .................... 137/315.15; 137/359
(58) Field of Classification Search ............ 137/315.15, 137/315.12, 801, 359, 454.5, 454.6; 251/286, 251/287, 288
See application file for complete search history.

(56) References Cited

U.S. PATENT DOCUMENTS 4,700,736 A * 10/1987 Sheen .................. 137/315.13
4,776,565 A * 10/1988 Sheen .................. 251/287
7,231,935 B2 * 6/2007 Huang .................. 137/315.15

* cited by examiner

*Primary Examiner*—Kevin L Lee
(74) *Attorney, Agent, or Firm*—Banger Shia

(57) ABSTRACT

A handle control valve assembly of a faucet comprises a handle control valve body formed with an upper thread section and a lower thread section; a top of the upper thread section being protruded with a control valve; a top of the control valve being formed with a threaded hole; at least one side of the upper thread section being formed with a limiting portion which is a longitudinal slit on the upper thread section; a lower clamp stop having round inner threaded holes; by the inner thread, the lower clamp stop being rotatable with respect to the upper thread section; a limiting unit; a lower side thereof being an engaging unit which is engaged to the outer side of the lower clamp stop; a top of engaging unit being extended with a resisting ring for combining an object; an inner side of the resisting ring having a confining portion.

8 Claims, 7 Drawing Sheets

HANDLE CONTROL VALVE ASSEMBLY OF FAUCET

FIELD OF THE INVENTION

The present invention relates to faucets, and particularly to a handle control valve assembly of a faucet which can be assembled easily and rapidly.

BACKGROUND OF THE INVENTION

Generally, a faucet for cool and hot water is controlled by a handle control valve assembly of a faucet. The handle control valve assembly of a faucet has a handle control valve body. An upper side and lower side of the body have respective stop rings for clamping the upper surface and lower surface of a basin. A decorating lower mask is engaged to the control valve at the top of the body. Then a screw is used to combine a handle seat and the control valve so that when the handle seat is rotated, the control valve is driven and thus the user can control the water flow.

In the installation of the handle control valve assembly of a faucet, the body passes through a predetermined position of the basin. Then a lower clamp stop is tightly screwed to a lower surface of a basin based on a width of the basin and the height is adjustable freely. Then a spanner is used to clamp the lower clamp stop so that the upper clamp stop at the upper side of the body will tighten the body to the basin and the body and the upper clamp stop will not rotate idly.

However the prior art faucet has the following disadvantages. In assembly, one hand must take a spanner to clamp the lower clamp stop and another hand rotates the upper clamp stop, while the space for installing the faucet is very finite. Thus the installation work is time consumed and tedious.

SUMMARY OF THE INVENTION

Accordingly, the primary object of the present invention is to provide a handle control valve assembly of a faucet which can be assembled easily and rapidly.

To achieve above object, the present invention provides a handle control valve assembly of a faucet comprising: a handle control valve body formed with an upper thread section and a lower thread section; a top of the upper thread section being protruded with a control valve; a top of the control valve being formed with a threaded hole; at least one side of the upper thread section being formed with a limiting portion which is a longitudinal slit on the upper thread section; a lower clamp stop having round inner threaded holes; by the inner thread, the lower clamp stop being rotatable with respect to the upper thread section; a limiting unit; a lower side thereof being an engaging unit which is engaged to the outer side of the lower clamp stop; a top of engaging unit being extended with a resisting ring for combining an object; an inner side of the resisting ring having a confining portion for confining the rotation of the limiting unit; an upper clamp stop; an interior thereof being formed with inner thread for engaging with the upper thread section; and a handle seat being positioned installed to the control valve; wherein when rotating the handle seat, the control valve will be driven to control the water inlet and outlet.

The various objects and advantages of the present invention will be more readily understood from the following detailed description when read in conjunction with the appended drawing.

BRIEF DESCRIPTION OF THE DRAWINGS

FIG. 1A is a partial enlarged view of the handle control valve assembly of a faucet of the present invention.

DETAILED DESCRIPTION OF THE INVENTION

In order that those skilled in the art can further understand the present invention, a description will be provided in the following in details. However, these descriptions and the appended drawings are only used to cause those skilled in the art to understand the objects, features, and characteristics of the present invention, but not to be used to confine the scope and spirit of the present invention defined in the appended claims.

Figure 1:
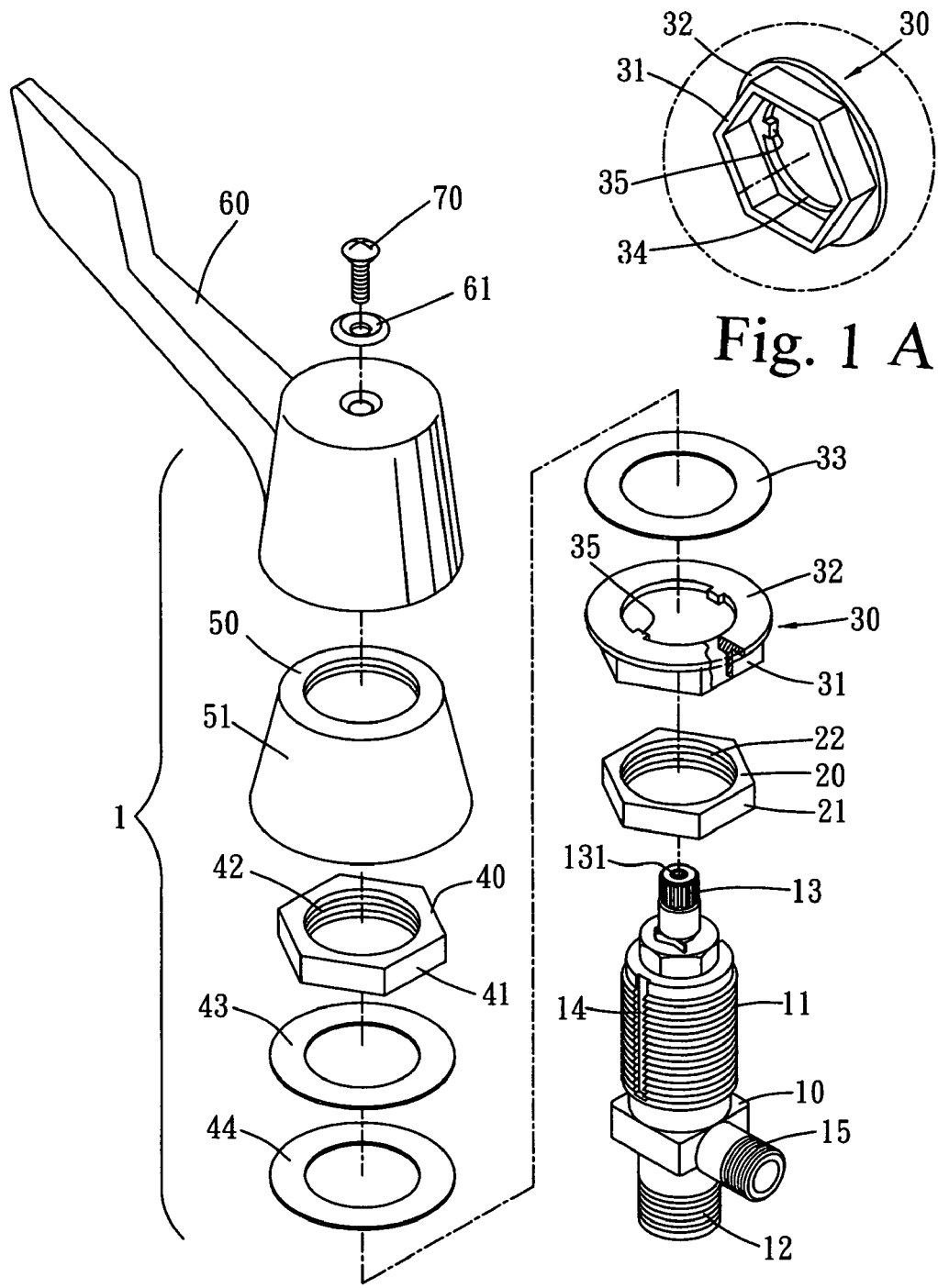
FIG. 1 is an explosive schematic view of the handle control valve assembly of a faucet of the present invention.
Figure 3:
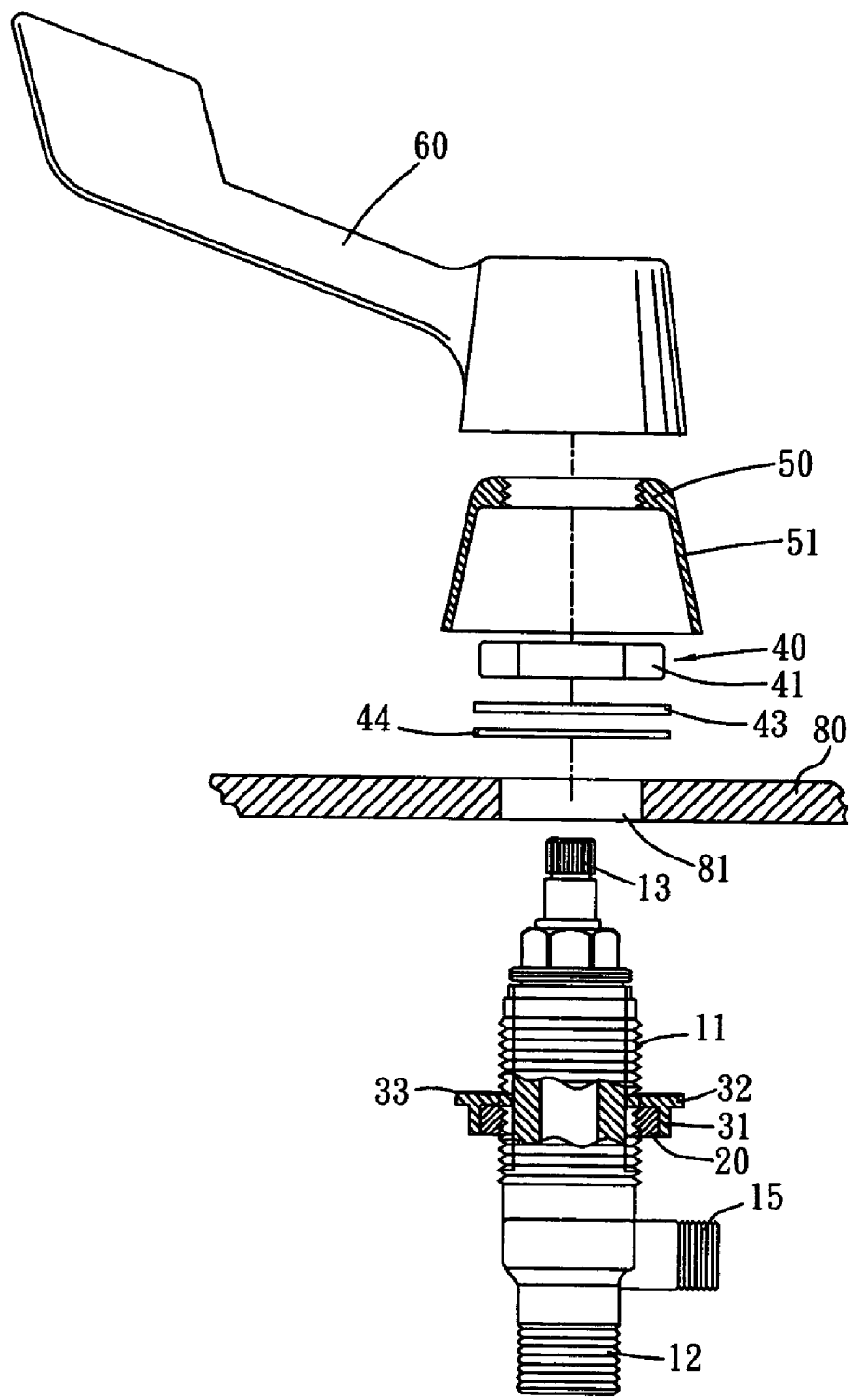
FIG. 3 is a structural schematic view of the handle control valve assembly of a faucet of the present invention.
Figure 6:
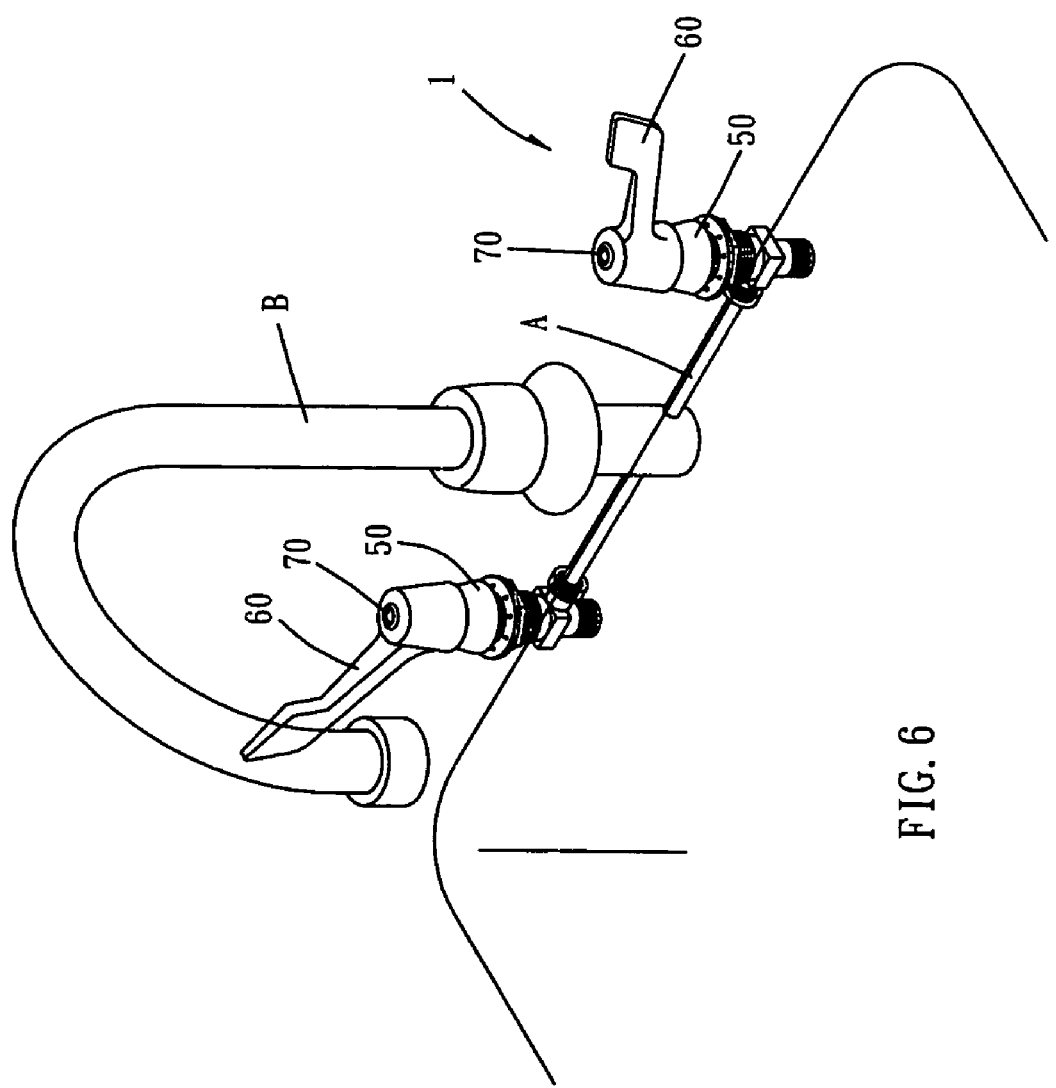
FIG. 6 is a perspective view showing that the present invention is combined with a basin.
Figure 7:
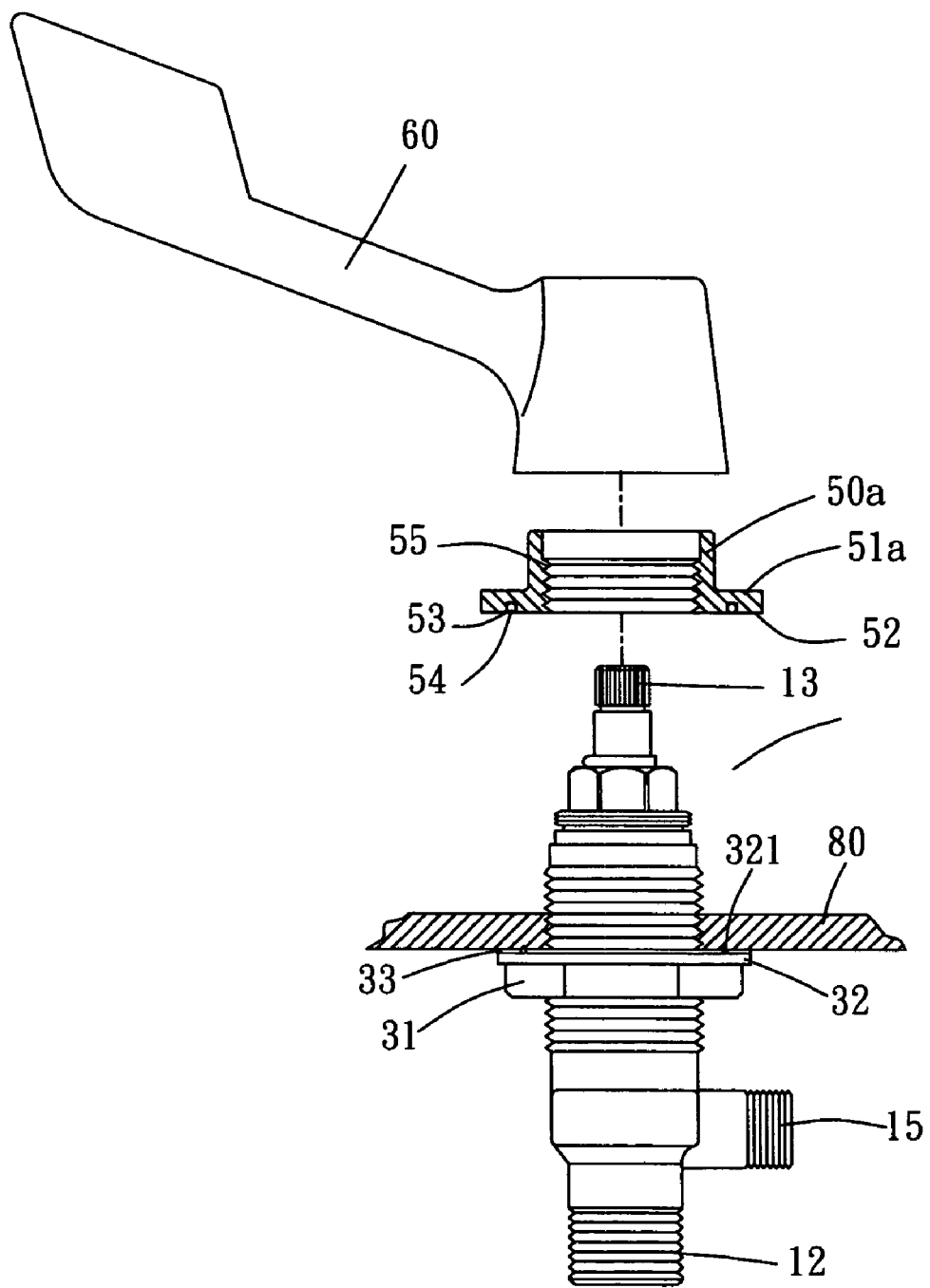
FIG. 7 is a structural cross sectional view in another embodiment of the handle control valve assembly of a faucet of the present invention.

Referring to FIGS. 1, 3 and 6, the handle control valve assembly of a faucet of a faucet of the present invention is illustrated. In the following the handle control valve assembly of a faucet 1 is used in both cool and hot water. However the present invention can be used to cool or hot water singly.

As illustrated in the drawings, the handle control valve assembly of a faucet 1 has the following elements.

A handle control valve body 10 is formed with an upper thread section 11 and a lower thread section 12. A top of the upper thread section 11 is protruded with a control valve 13. A top of the control valve 13 is formed with a threaded hole 131. At least one side of the upper thread section 11 is formed with a limiting portion 14 which is a longitudinal slit on the upper thread section 11. Moreover, the lower thread section 12 may be engaged with a cool (or hot) water tube (not shown). A transversal threaded connecting tube 15 is connected between the upper thread section 11 and lower thread section 12. The threaded connecting tube 15 is communicated to the body 10. The threaded connecting tube 15 can be further connected to a pipe A for guiding water to the water outlet B of a faucet.

A lower clamp stop 20 has hexagonal outer sides 21 and round inner threaded holes 22. By the inner thread, the lower clamp stop 20 is rotatable with respect to the upper thread section 11.

A limiting unit 30 has a T shape. A lower side thereof is an engaging unit 31 which is engaged to the outer side of the lower clamp stop 20. A top of engaging unit 30 is extended with a resisting ring 32 for combining an object (such as a basin). A top of the resisting ring 32 can be added with a washer 33. The connection of the resisting ring 32 and the engaging unit 31 is extended with an inner edge 34 with a predetermined width for stopping the lower clamp stop 20 as the lower clamp stop 20 is engaged to the engaging unit 31. In the drawing, the confining portion 35 is a block corresponding the limiting portion 14 which is a slit in this embodiment.

An upper clamp stop 40 has a hexagonal outer side 41 corresponding to that of the lower clamp stop 20. An interior thereof is formed with inner thread 42 for engaging with the upper thread section 11. A washer 43 and a pad 44 are placed therebetween.

A cover 50 has a tapered shield 51 for shielding the upper clamp stop 40.

A handle seat 60 is positioned on a top of the cover 50 by using a screw 70 to pass through a pad 61 and the threaded hole 131 of the control valve 13. Thereby, when rotating the handle seat 60, the control valve 13 will be driven to control the water inlet and outlet.

Figure 2:
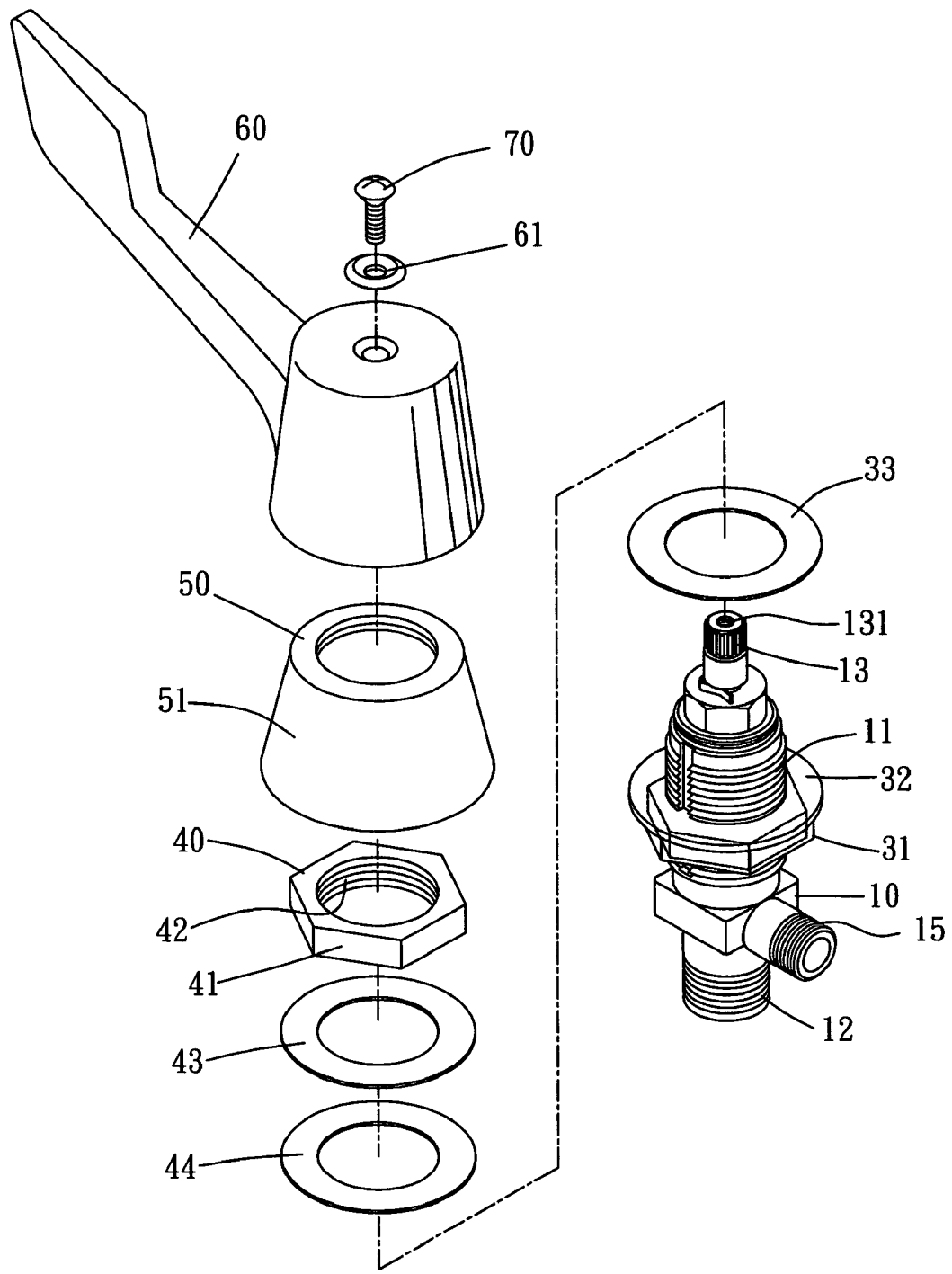
FIG. 2 is a partial assembled view of the handle control valve assembly of a faucet of the present invention.
Figure 4:
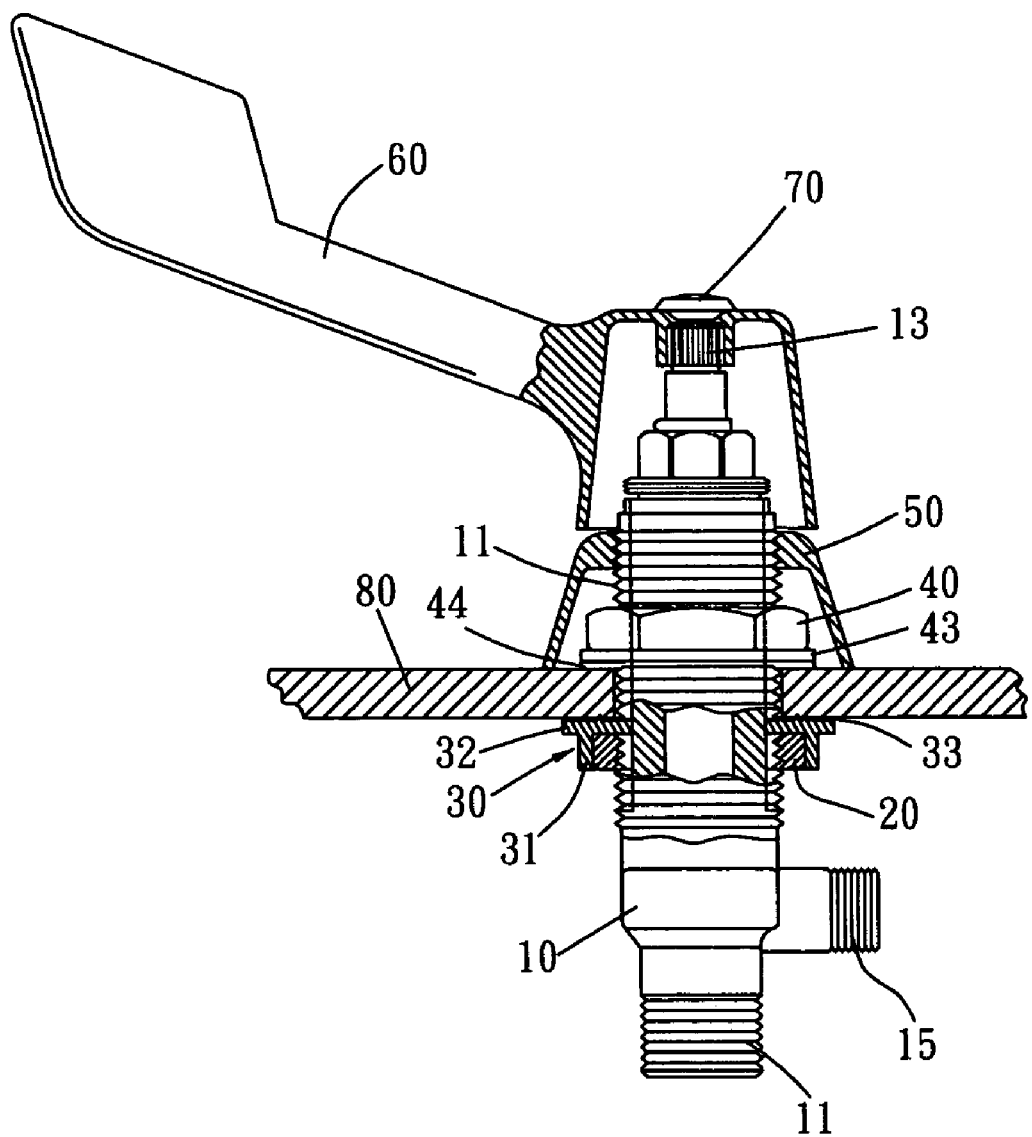
FIG. 4 is a schematic cross sectional view of the handle control valve assembly of a faucet of the present invention, which is assembled.

Referring to FIGS. 2 to 4, the assembly of the present invention will be described herein.

Referring to FIG. 2, the lower clamp stop 20 is locked to the upper thread section 11 of the body 10. Then the limiting unit 30 is confined by the limiting portion 14 of the body 10 by moving the limiting unit 30 along the upper thread section 11 and by the guiding of the confining portion 35 so as to limit the rotation of the body 10. Then the washer 33 is placed upon the limiting unit 30.

Referring to FIGS. 3 and 4, the body 10 is placed into a hole 81 of an object 80. The limiting unit 30 is adjusted so that the washer 33 of the resisting ring 32 of the limiting unit 30 is tightly adhered upon a lower surface of the object 80 (for example, a basin). Then the pad 44, washer 43 and the upper clamp stop 40 are engaged. The upper clamp stop 40 is rotated to resist against the upper surface of the object 80, the limiting portion 14 of the body 10 and the confining portion 35 of the limiting unit 30 are engaged so as to confine the rotation. The user only need hold the control valve 13 and then rotate the upper clamp stop 40 so that the upper clamp stop 40 can move downwards along the upper thread section 11 to resist against an upper surface of the object 80. Then the cover 50 is locked to the upper thread section 11 of the body 10. Then a handle seat 60 is positioned on a top of the cover 50 by using a screw 70 to pass through a pad 61 and the threaded hole 131 of the control valve 13. Thereby, when rotating the handle seat 60, the control valve 13 will be driven to control the water inlet and outlet. No spanner is used to clamp the lower clamp stop 20. The operation of the present invention is easy.

In the present invention, the limiting portion 14 and the limiting unit 30 have the advantage that no spanner is used to clamp the lower clamp stop 20. The operation of the present invention is easy.

Figure 5:
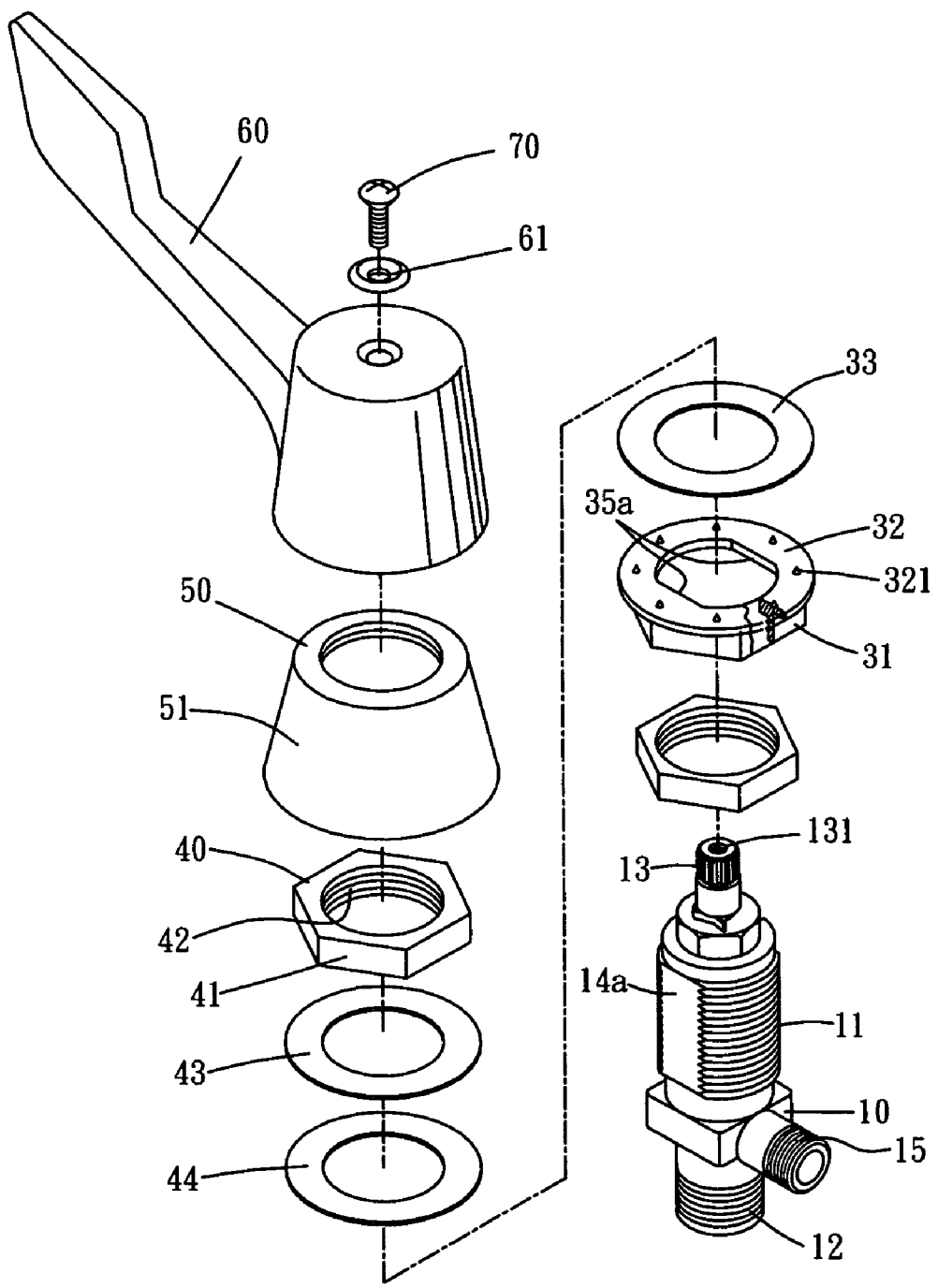
FIG. 5 is an explosive schematic view of the second embodiment of the handle control valve assembly of a faucet of the present invention.

With referring to FIG. 5, in the present invention, the second embodiment of the present invention is illustrated. In this embodiment, those identical to the above embodiment will not be further described herein. Only those different from above embodiment are described.

In this embodiment, the limiting portion 14a is a longitudinal cut surface from the upper thread section 11. The confining portion 35 in the limiting unit 30 is two cut straight sides on the inner side of the limiting unit 30. Thus, by the limiting unit 30, the body 10 will not rotate with the upper clamp stop 40 synchronously (idle rotation).

In the present invention, to have a better confinement in the rotation of the body 10 with the upper clamp stop 40, a surface of the resisting ring 32 of the limiting unit 30 is added with a plurality of needles 321. When the present invention is to combine with wood or acrylic material, the needles 32 can tightly engage the lower surface of the object to be combined for providing a resisting force in rotation.

Referring to FIGS. 3 to 7, the upper clamp stop 40, washer 43 and pad 44 can be combined to the cover 50a. A lower edge of the cover 50 is extended with a flat portion 52 for flatly adhered to an object to be combined. The flat portion 52 has an annular recess 53 for receiving a pad 54. An internal of the cover 50a is formed with inner thread 55 for engaging the upper thread section 11 and the lower thread section 12.

The present invention is thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A handle control valve assembly of a faucet comprising:
a handle control valve body formed with an upper thread section and a lower thread section; a top of the upper thread section being protruded with a control valve; a top of the control valve being formed with a threaded hole; at least one side of the upper thread section being formed with a longitudinal slit as a limiting portion;
a lower clamp stop having round inner threaded holes; by an inner thread, the lower clamp stop being rotatable with respect to the upper thread section;
a limiting unit; a lower side thereof being an engaging unit which is engaged to an outer side of the lower clamp stop; a top of the engaging unit being extended with a resisting ring; an inner side of the resisting ring having a confining portion for confining rotation of the limiting unit;
an upper clamp stop: an interior thereof being formed with an inner thread for engaging with the upper thread section; and
a handle seat being installed to the control valve; wherein when rotating the handle seat, the control valve will be driven to control a water inlet and outlet.

2. The handle control valve assembly of a faucet as claimed in claim 1, wherein a washer is installed between the resisting ring and a lower surface of the object to be combined and another washer is installed between the upper clamp stop and an upper surface of the object.

3. The handle control valve assembly of a faucet as claimed in claim 1, wherein a lower side of the upper clamp stop is installed with a washer and a pad.

4. The handle control valve assembly of a faucet as claimed in claim 1, wherein a cover is installed between the tipper clamp stop and the handle seat; the cover is formed with an enlarged shield; and the cover is engaged 10 the upper thread section for shielding the ripper clamp stop.

5. The handle control valve assembly of a faucet as claimed in claim 1, wherein the upper clamp stop is formed as a cover and a lower end thereof has a washer.

6. The handle control valve assembly of a faucet as claimed in claim 1, wherein the limiting portion is a slit and the confining portion is at least one protrusion corresponding to the slit.

7. The handle control valve assembly of a faucet as claimed in claim 1, wherein the limiting portion is a cut surface and the confining portion is at least one flat surface in an inner side of the resisting ring corresponding to the cut surface.

8. The handle control valve assembly of a faucet as claimed in claim 1, wherein a transversal threaded connecting tube is connected between the upper thread section and lower thread section; the threaded connecting tube can be further connected to a pipe for guiding water to the water outlet of a faucet.

* * * * *